Patented Dec. 25, 1934

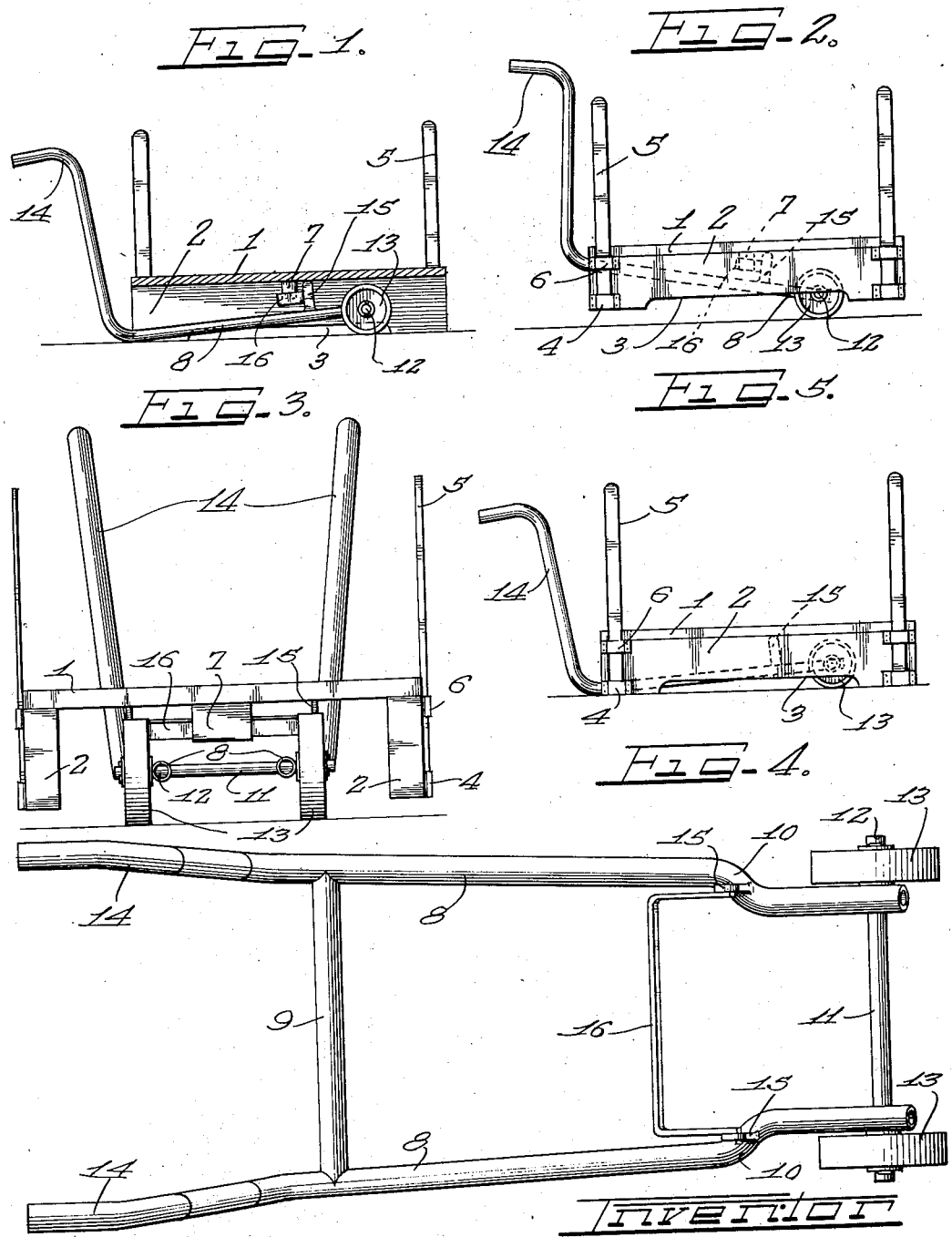

1,985,362

UNITED STATES PATENT OFFICE 1,985,362

TRUCK

John L. Clyde, Joliet, Ill.

Application May 31, 1933, Serial No. 673,633

5 Claims. (Cl. 214—65)

In the moving of piles or stacks of collapsible chairs in lodge halls or in places where portable chairs are extensively used, it has been a source of considerable trouble and inconvenience when moving large quantities of chairs on trucks from one room or location to another to first get a truck and then move it in the vicinity of the chairs to be transported, pile the chairs on the truck and then push the truck to a desired location, where the chairs are removed from the truck and piled on the floor until ready for use. The emptied truck is then returned to the original source of another supply of chairs.

To overcome the inconvenience hereinbefore referred to with regard to the handling of chairs or other articles, the present invention has been devised to provide a simplified form of combination truck and platform whereby the handling of chairs and similar articles is greatly facilitated by the provision of a truck frame which may be moved into and out of engagement with a truck body or supporting platform to transport the platform and the load carried thereby into a desired location, and then remove the truck frame from its association with the platform which is lowered into position on the floor and left there with the load supported thereon, thereby permitting the removable truck frame to be re-used in combination with another truck body or platform thus obviating the necessity of repeatedly piling up and unloading of the chairs or other articles as has been necessary heretofore with the use of former types of trucks.

It is an object of this invention to provide a simplified and inexpensive type of portable truck wherein the truck frame is removably engaged with the truck body or platform.

It is also an object of this invention to provide a portable truck frame adapted to be removably engaged beneath a truck body and having means for elevating the truck body to permit the same to be transferred into a different location and then lowered upon the floor allowing the truck frame to be removed from engagement therewith.

It is a further object of this invention to provide an improved type of portable truck consisting of a truck body and a portable truck frame removably engaged therein, said truck body and frame having means co-acting with one another for the purpose of properly centering the load on the truck frame when the device is in use.

It is furthermore an object of this invention to provide an improved and simplified form of portable truck wherein a truck body or platform is adapted to have removably projected therebeneath from either end a portable truck frame whereby the truck body may be moved into any desired location when loaded after which the truck frame may be removed from engagement therewith leaving the truck body in the selected position permitting re-use of the truck frame for the purpose of transporting similar truck bodies.

It is an important object of this invention to provide an improved and simplified inexpensive type of portable truck comprising a substantially channel shaped truck body into which a truck frame may be engaged from either end of the truck body to raise the truck body out of engagement with the floor, and then transport the truck body into a desired location in which it is adapted to be lowered into contact with the floor while the truck frame is removed from engagement therewith for re-use in connection with similar truck bodies.

Other and further important objects of this invention will be apparent from the disclosures in the specification and the accompanying drawing.

The invention (in a preferred form) is illustrated in the drawing and hereinafter more fully described.

On the drawing:

Figure 1 is a side elevation partly in section of an improved truck embodying the principles of this invention illustrating the truck in normal position with the body and truck frame resting on the floor.

Figure 2 is a side elevational view of the truck with the truck frame elevated in position for use and holding the truck body elevated above the surface of the floor to permit the truck to be propelled.

Figure 3 is an enlarged end elevational view of the truck taken at the front end of Figure 2.

Figure 4 is a top plan view of the truck frame with the truck body removed.

Figure 5 is a side elevational view of a modified form of the truck with the body and the truck frame in normal position resting on the floor.

As shown on the drawing:

The improved truck comprises a body unit and a truck unit which are adapted to be used in combination or independently of one another.

The body unit of the truck is adapted to be used as a supporting platform adapted to rest on the floor permitting a stack of chairs, boxes or other articles to be supported thereon. The body unit is of substantially channel shaped cross section open at the bottom and at both ends and comprises a supporting plate or top 1 having rigidly secured to the longitudinal margins thereof downwardly projecting side boards or legs 2 which may be cut away at 3 along the lower edge if desired. Secured to the lower margins of the outer faces of the side boards 2 are socket members 4 to receive the lower ends of removable retaining posts or bars 5 provided when necessary for the purpose of holding chairs or other articles in position upon the body or platform unit. Also secured on the outer sides of the legs or side boards 2 near the upper margins thereof are retaining straps 6 through which the posts or bars 5 project to hold the same in proper position with the upper end of the posts projecting above the top surface of the platform or body unit. In case the retaining posts are not required they may be readily removed.

In the form of the device illustrated in Figures 1 to 4 inclusive the top board 1 has rigidly secured in substantially the center of the under surface thereof a downwardly projecting stop member or block 7. The stop member 7 is provided to serve as a centering means for the load upon the truck frame as hereinafter more fully described.

The truck unit for the device comprises a framework consisting of a pair of frame sills 8 connected by means of a cross bar or brace rod 9. The sills 8 at one end are deflected inwardly toward one another at 10 thereby bringing the front end of the sills closer together as clearly illustrated in Figure 4 to form a suitable support for a bearing sleeve and brace 11. Journaled in the bearing sleeve 11 and projecting outwardly beyond each side of the truck frame is an axle 12 on the ends of which rollers or wheels 13 are mounted. The rear ends of the frame sills are bent upwardly and then outwardly to provide handles 14 which may diverge as illustrated in Figures 3 and 4 to afford sufficient space therebetween for an operator desiring to handle the truck.

Integrally formed or rigidly secured at the bent portions 10 of the frame sills 8 are upwardly projecting studs or lugs 15. Rigidly connecting the two studs 15 is a yoke or bridge member 16 which projects inwardly from the front end of the truck frame as clearly illustrated in Figure 4 into a position to permit the same to co-act with the stop member 7 when the front end of the truck frame is projected beneath the truck body unit as illustrated in Figure 1. It will thus be noted that the truck frame unit is adapted to be projected into the stationary body unit when the truck frame is lowered so that when the yoke member 16 contacts the stop member 7 the truck body and the truck frame unit are properly associated with one another for the proper centering of the load on the truck unit.

With the truck unit projected into the stationary body unit resting on the floor as illustrated in Figure 1, the attendant or operator merely engages the handles 14 and swings the truck frame upwardly into the position illustrated in Figure 2 thereby causing the truck 15 and the frame sills 8 to raise the truck body off of the floor thereby permitting the truck to be moved about on the rollers or wheels 13.

In the modified showing of the truck device as illustrated in Figure 5, the various parts are similar to those illustrated and described in connection with Figures 1 to 4 of the drawing. In this modified form of the device, the stop member 7 and the bridge or yoke member 16 are omitted.

The improved truck is readily adaptable and convenient for use in handling collapsible chairs in lodge halls and the like and for the moving of other articles of manufacture. A number of the body units may be provided for use with a single truck unit whereby a body unit when positioned upon the floor as illustrated in Figure 1 may have a supply of collapsible chairs or other articles stacked thereon. After the truck body has been loaded, the portable truck unit is engaged beneath the body unit by projecting the wheel supporting end of the truck unit into either open end of the body unit, until the yoke or bridge member 16 contacts the stop member 7. With the body unit and the truck frame unit associated with one another as illustrated in Figure 1, the truck frame is raised by means of the handles 14 with the frame sills pivoting about the axle 12 so that the studs 15 and portions of the frame sills 8 are brought into contact with the lower surface of the body top plate 1 so that the body unit is lifted off of the floor and the truck is adapted to be moved about on the wheels 13 to the location to which it is desired to move the chairs or articles carried by the truck body. When the destination for the load is reached, the frame handles 14 are merely lowered thereby permitting the truck body to be lowered into engagement with the floor permitting the truck frame unit to be pulled out from underneath the body unit for re-use in combination with another loaded truck body. The loaded body unit may be unloaded immediately or if desired the load may remain on the supporting truck body or platform until the chairs or other articles forming the load are needed.

In the form of the device illustrated in Figures 1 to 4 inclusive, the stop member 7 in combination with the yoke 16 provides an arrangement for properly centering the load on the truck frame and also serves as a means for preventing the loaded truck body from accidentally sliding forwardly off of the truck unit when the truck is in use.

The removable posts or bars 5 may be used whenever it is found necessary for the purpose of retaining a load in position on the truck body or platform unit.

It will, of course, be understood that many details of construction may be varied through a wide range without departing from the principles of this invention and it is therefore not the purpose to limit the patent granted hereon otherwise than necessitated by the scope of the appended claims.

I claim as my invention:

1. A truck device comprising a body normally resting on the floor, a truck frame projectable into the body, rollers on the frame for supporting one end thereof with the opposite end of the frame shaped to normally rest on the floor, and projections on said frame movable into the body when the frame is lowered and also movable into engagement with the body when the frame is raised to lift the body off of the floor.

2. A truck device comprising a body unit open at the bottom and at both ends and normally positioned to rest on the floor, a truck unit for projection into either end of the body unit, said truck unit consisting of a frame, roller means for supporting one end of the frame above the floor, with the opposite end of the frame normally adapted to rest on the floor, handles formed on the end of the frame which normally rests on the floor, and stud members on said frame movable into engagement with the body unit when the frame is pivotally swung by means of the handles about the roller means and into engagement with the body unit to raise the same off of the floor.

3. A truck device comprising a body unit open at the bottom and at both ends and normally positioned to rest on the floor, a stop member in said body unit, and a truck unit independent of the body unit constructed to be projected into either end of the body unit without disturbing the position thereof, said truck unit comprising a frame, roller means for supporting one end of the frame above the floor, handles on the opposite ends of the frame, stud members on said frame movable into the body unit with the roller end of the frame, and a yoke member connecting the stud members and movable into engagement with the stop means of the body unit to limit the insertion of the roller supported end of the truck frame into the body unit and also serving as a means for centering the body unit with respect to the truck unit when the handle carrying end of the frame is pivotally swung about the roller supported end of the frame into engagement with the body unit to raise the same off of the floor.

4. In a truck device, the combination with a truck body, of stop members projecting downwardly therein, a truck unit for removable engagement therein, said truck unit comprising a pair of sills bent at one end to form handles, cross members connecting the sills, roller means for supporting the end of the truck unit opposite the handles, studs projecting upwardly from said sills to serve as supports for the truck body, and a yoke member connecting said studs to co-act with the stop members in the truck body for limiting the projection of the truck unit into the truck body.

5. A truck device comprising, in combination, a truck body, stop members projecting downwardly therefrom, a roller truck unit for removable engagement in said truck body, and means on said truck unit for co-action with said stop members to limit the insertion of the truck unit into the truck body and hold the truck body properly centered on the truck unit.

JOHN L. CLYDE.